(12) United States Patent
Tsai et al.

(10) Patent No.: US 12,397,869 B2
(45) Date of Patent: Aug. 26, 2025

(54) FRONT WINDSHIELD STRUCTURE OF MOTORCYCLE

(71) Applicant: KWANG YANG MOTOR CO., LTD., Kaohsiung (TW)

(72) Inventors: Feng-Chih Tsai, Kaohsiung (TW); Cheng-Hung Huang, Kaohsiung (TW); En-Ti Yeh, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 389 days.

(21) Appl. No.: 18/125,744

(22) Filed: Mar. 24, 2023

(65) Prior Publication Data

US 2023/0339560 A1 Oct. 26, 2023

(30) Foreign Application Priority Data

Apr. 22, 2022 (TW) .................... 111115490

(51) Int. Cl.
*B62J 17/04* (2006.01)
(52) U.S. Cl.
CPC ..................... *B62J 17/04* (2013.01)
(58) Field of Classification Search
CPC ....................................................... B62J 7/04
USPC ....................................................... 296/78.1
See application file for complete search history.

(56) References Cited

U.S. PATENT DOCUMENTS

| 7,261,359 | B2 * | 8/2007 | Furuhashi | B62J 17/04 296/84.1 |
| 7,552,960 | B2 * | 6/2009 | Yoshitake | B62J 17/04 296/78.1 |
| 7,604,279 | B2 * | 10/2009 | Masuda | B62J 17/04 296/78.1 |
| 9,199,683 | B2 * | 12/2015 | Kitagawa | B62J 17/04 |
| 2006/0028045 | A1 * | 2/2006 | Furuhashi | B62J 17/04 296/84.1 |
| 2008/0111392 | A1 * | 5/2008 | Masuda | B62J 17/04 296/78.1 |

* cited by examiner

*Primary Examiner* — Jason S Morrow
(74) *Attorney, Agent, or Firm* — Leong C. Lei (57) ABSTRACT

A motorcycle windshield structure includes a windshield support frame set that supports a windshield and includes a vehicle body mounting frame seat unit, a sliding frame unit on the vehicle body mounting frame seat unit, and a power unit driving the sliding frame unit to slide. The vehicle body mounting frame seat unit includes a slide rail mounting frame having first and second guide roller sets. The sliding frame unit includes slide rails connected to the slide rail mounting frame and a sliding frame slidable along the slide rails. The power unit includes a power motor and first and second control cables respectively wound around the first and second guide roller sets. The power motor and the first and second control cables define, respectively, a raising stroke and a lowering stroke for the windshield, which are arranged, in a parallel manner, in a vehicle left-right direction.

9 Claims, 11 Drawing Sheets

FRONT WINDSHIELD STRUCTURE OF MOTORCYCLE

TECHNICAL FIELD OF THE INVENTION

The present invention relates generally to a front windshield of a motorcycle, and more particularly to a front windshield structure of a motorcycle that allows easy adjustment of a height of the motorcycle front windshield.

DESCRIPTION OF THE PRIOR ART

Figure 1:
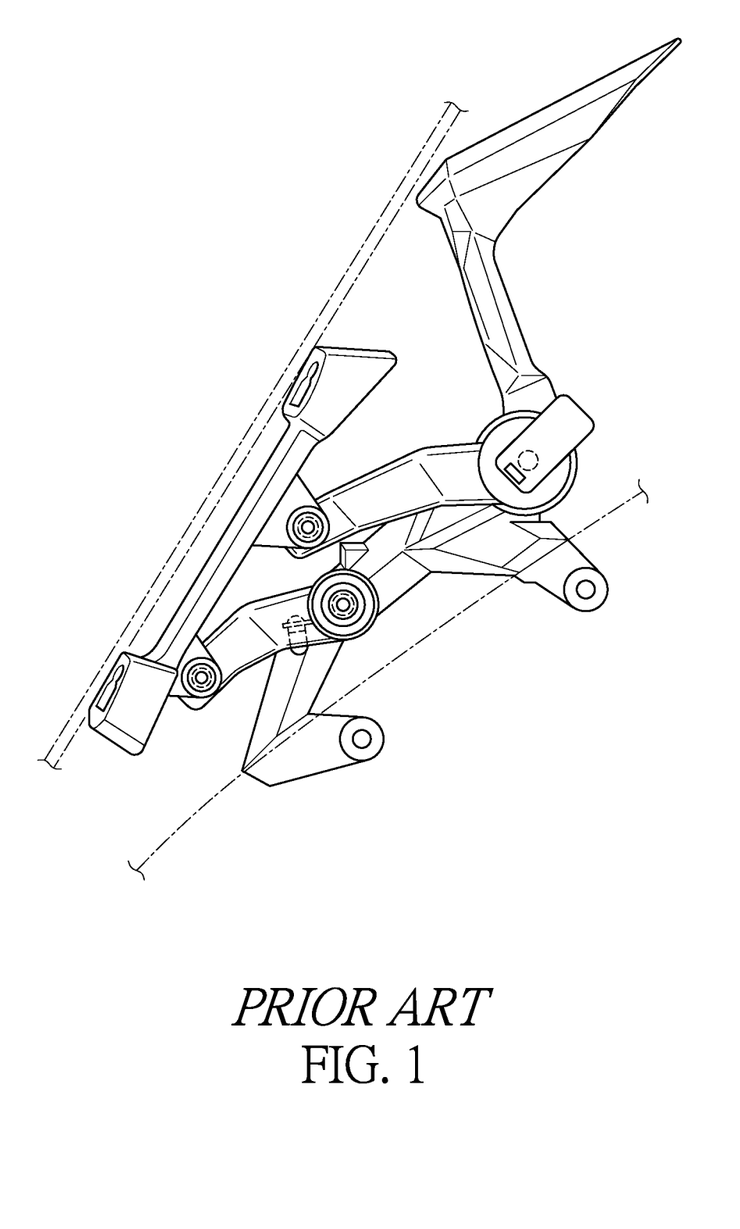
FIG. 1 shows Japanese Laid Open Patent Publication No. 2017-124808.

To protect a motorcycle rider from being compressed by strong winds, a windshield is mounted on a front part of a motorcycle. The windshield provides an effect of blocking winds, so as to protect the rider from being compressed by strong winds to thereby enhance comfort of riding for the rider. As shown in FIG. 1, in for example Japanese Laid Open Patent Publication No. 2017-124808, an effect of blocking wind is available for a rider riding a motorcycle; however, the known patent discloses a structure that is excessively complicated and is hard to adjust. Thus, it is a challenge for the motorcycle windshield manufacturers to provide a front windshield structure of a motorcycle that is simple and easy to adjust a height thereof.

SUMMARY OF THE INVENTION

The primary object of the present invention is to provide a front windshield structure of a motorcycle, by which the drawbacks of the prior art windshield that is complicated in adjustment of the height thereof and is hard to control can be overcome.

For such a purpose, the present invention provides a front windshield structure of a motorcycle, comprising a windshield support frame set and a windshield arranged on the windshield support frame set, the windshield support frame set comprising a vehicle body mounting frame seat unit, a sliding frame unit on the vehicle body mounting frame seat unit, and a power unit operable to cause the sliding frame unit to slide, the windshield being arranged on the sliding frame unit; the vehicle body mounting frame seat unit comprising a vehicle body mounting frame and a slide rail mounting frame, the slide rail mounting frame being provided with a first guide roller set and a second guide roller set; the sliding frame unit comprising slide rails connected to the slide rail mounting frame and a sliding frame that is guided by and sliding along the slide rails, the sliding frame being provided with a first guide wire connection seat and a second guide wire connection seat; the power unit comprising a power motor, and a first control cable and a second control cable that are coupled to the power motor and are drivable by the power motor, the first control cable being wound around the first guide roller set to connect to the first guide wire connection seat, the second control cable being wound around the second guide roller set to connect to the second guide wire connection seat; characterized in that the power motor and the first control cable define a raising stroke of the windshield, and the power motor and the second control cable define a lowering stroke of the windshield, and in a front view of the motorcycle, the raising stroke of the windshield and the lowering stroke of the windshield are arranged, in a parallel manner, in a vehicle left-right direction.

For such a purpose, in some embodiments of the present invention, a front windshield structure of a motorcycle is provided, wherein the first guide roller set comprises a guide roller seat and a guide roller pivotally mounted on the guide roller seat and is freely rotatable; and in a side view of the motorcycle, at least a portion of the guide roller is located below the slide rails.

For such a purpose, in some embodiments of the present invention, a front windshield structure of a motorcycle is provided, wherein the first control cable comprise an outer tube and an inner wire; one end of the outer tube is connected to the power motor, and the inner wire is penetrating through and arranged in the outer tube, an end of the inner wire penetrating through the outer tube to connect in the power motor, an opposite end of the inner wire being provided with a connecting element, the side of the inner wire that is provided with the connecting element being wound around the guide roller of the first guide roller set to connect, by means of the connecting element, to the first guide wire connection seat; the second control cable comprises an outer tube and an inner wire; one end of the outer tube is connected to the power motor, and the inner wire is penetrating through and arranged in the outer tube, an end of the inner wire penetrating through the outer tube to connect in the power motor, an opposite end of the inner wire being provided with a connecting element, the side of the inner wire that is provided with the connecting element being wound around the guide roller of the second guide roller set to connect, by means of the connecting element, to the second guide wire connection seat.

For such a purpose, in some embodiments of the present invention, a front windshield structure of a motorcycle is provided, wherein the slide rails are formed of generally C-shaped and one-side-open rails arranged pairwise as a left one and a right one, and the slide rails are generally curved.

For such a purpose, in some embodiments of the present invention, a front windshield structure of a motorcycle is provided, wherein the sliding frame is provided, on each of two outer sides, with at least one guide block.

For such a purpose, in some embodiments of the present invention, a front windshield structure of a motorcycle is provided, wherein the guide block comprises an elastic pad.

For such a purpose, in some embodiments of the present invention, a front windshield structure of a motorcycle is provided, wherein the motorcycle comprises a vehicle frame unit, the vehicle frame unit being provided with a power unit fastening seat at a location below the head tube, the power unit fastening seat receiving the power motor of the power unit to fasten thereto and position thereon.

For such a purpose, in some embodiments of the present invention, a front windshield structure of a motorcycle is provided, wherein the slide rail mounting frame is provided with a receiving portion that is formed through recessing, and the first guide roller set is arranged in the receiving portion.

For such a purpose, in some embodiments of the present invention, a front windshield structure of a motorcycle is provided, wherein when viewed from a vehicle body front side of the motorcycle, the first guide roller set and the second guide roller set are respectively arranged upper and lower sides of the slide rail mounting frame, and are arranged parallel in a vehicle left-right direction in a front view of the motorcycle.

The efficacy that the present invention achieves is that adjustment of height for the windshield is made easy and bulkiness of the front of the motorcycle is prevented.

The efficacy that the present invention achieves is that easiness of adjustment of height for raising and lowering of the windshield is guaranteed.

The efficacy that the present invention achieves is that adjustability of height for raising and lowering of the windshield is enhanced.

The efficacy that the present invention achieves is that an effect of smooth sliding of the sliding frame is enhanced.

The efficacy that the present invention achieves is that an effect of positioning for sliding of the sliding frame is guaranteed.

The efficacy that the present invention achieves is that impacting sound of the sliding frame during sliding is effectively reduced.

The efficacy that the present invention achieves is that positionability of the power unit is enhanced, and the overall weight of the windshield support frame set is effectively reduced.

The efficacy that the present invention achieves is that an effect of protection for the first guide roller set is enhanced.

The efficacy that the present invention achieves is that a space of the slide rail mounting frame can be effectively utilized, and interference of the first guide roller set and the second guide roller set with other components on left and right sides of a front vehicle portion of the motorcycle can be prevented, and bulkiness of the front of the motorcycle due to the arrangement of the first guide roller set and the second guide roller set is prevented.

DETAILED DESCRIPTION OF THE PREFERRED EMBODIMENT

Firstly, referring to FIGS. 2, 3, 4, and 5, the present invention provides a front windshield structure of a motor. A windshield support frame set 2 is arranged on and assembled to a head tube 111 of a vehicle frame unit 11 of the motorcycle 1, and a windshield 6 is arranged on and assembled to the windshield support frame set 2. The windshield support frame set 2 comprises a vehicle body mounting frame seat unit 3 arranged on and assembled to the head tube 111, a sliding frame unit 4 arranged on and locked to the vehicle body mounting frame seat unit 3, and a power unit 5 operable to drive the sliding frame unit 4 to slide and move.

Figure 3:
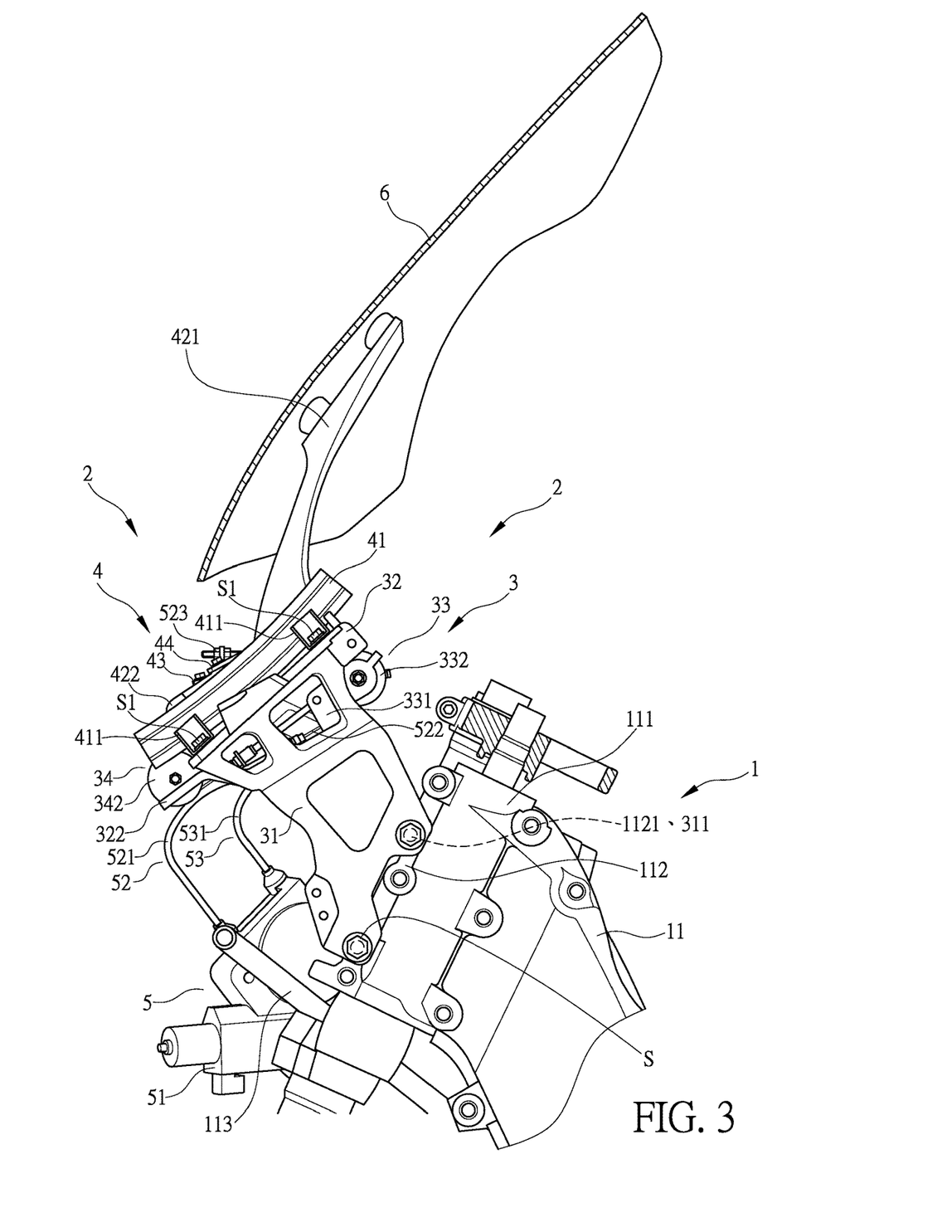
FIG. 3 is a side elevational view showing a windshield and a windshield support frame set assembled together according to the present invention.
Figure 4:
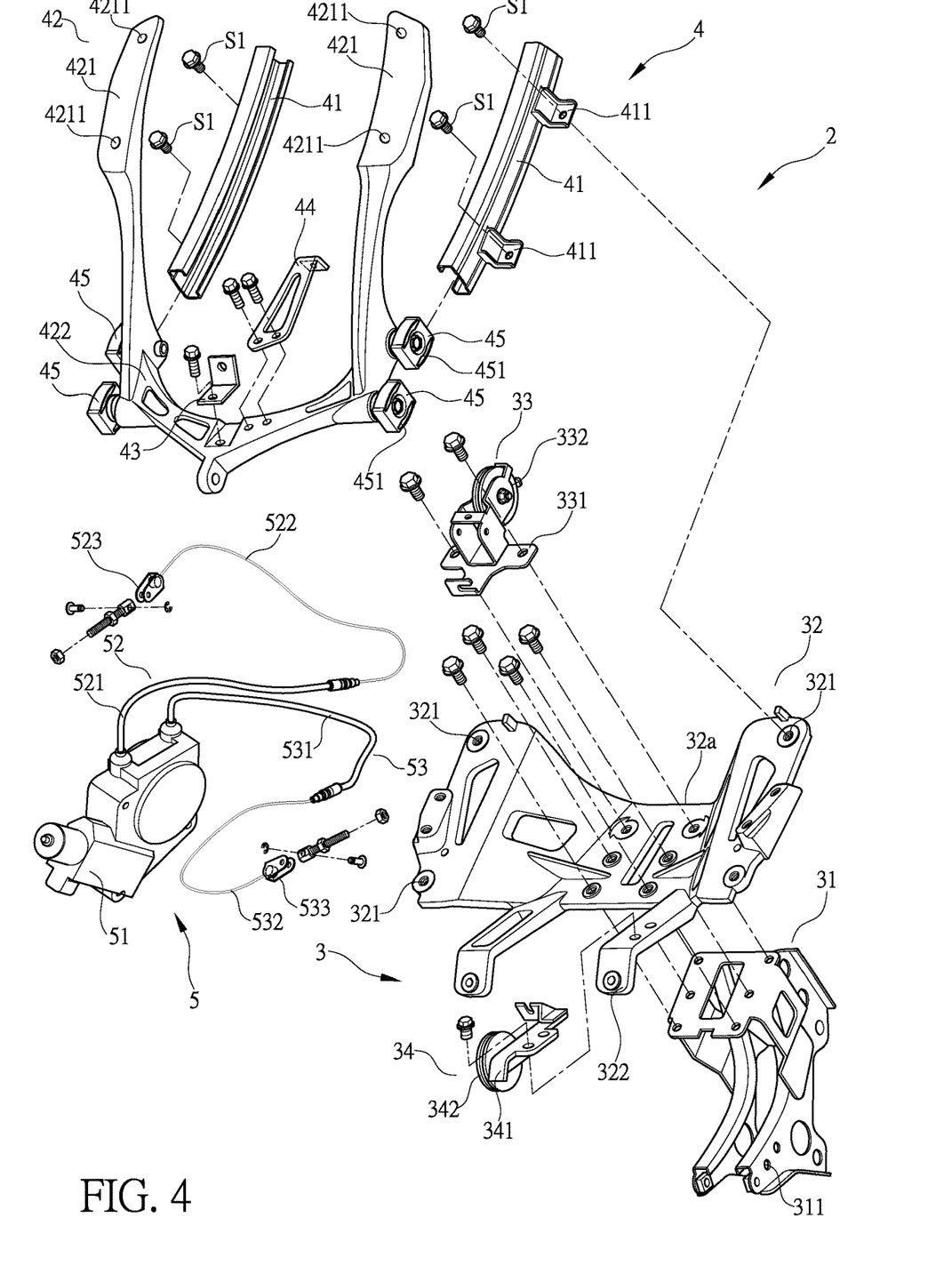
FIG. 4 is an exploded view of the windshield and the windshield support frame set according to the present invention.
Figure 5:
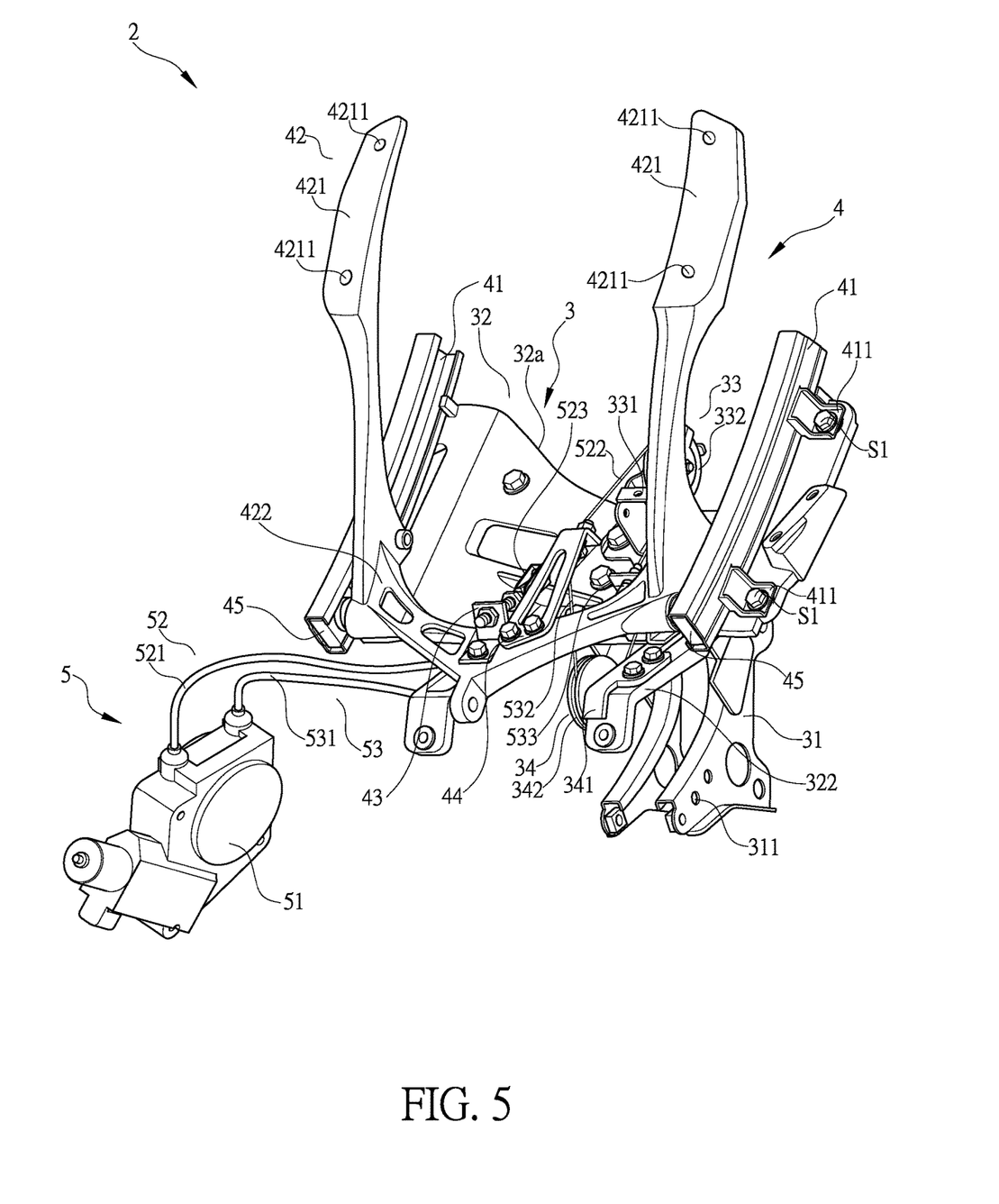
FIG. 5 is a perspective view showing the windshield support frame set according to the present invention.
Figure 6:
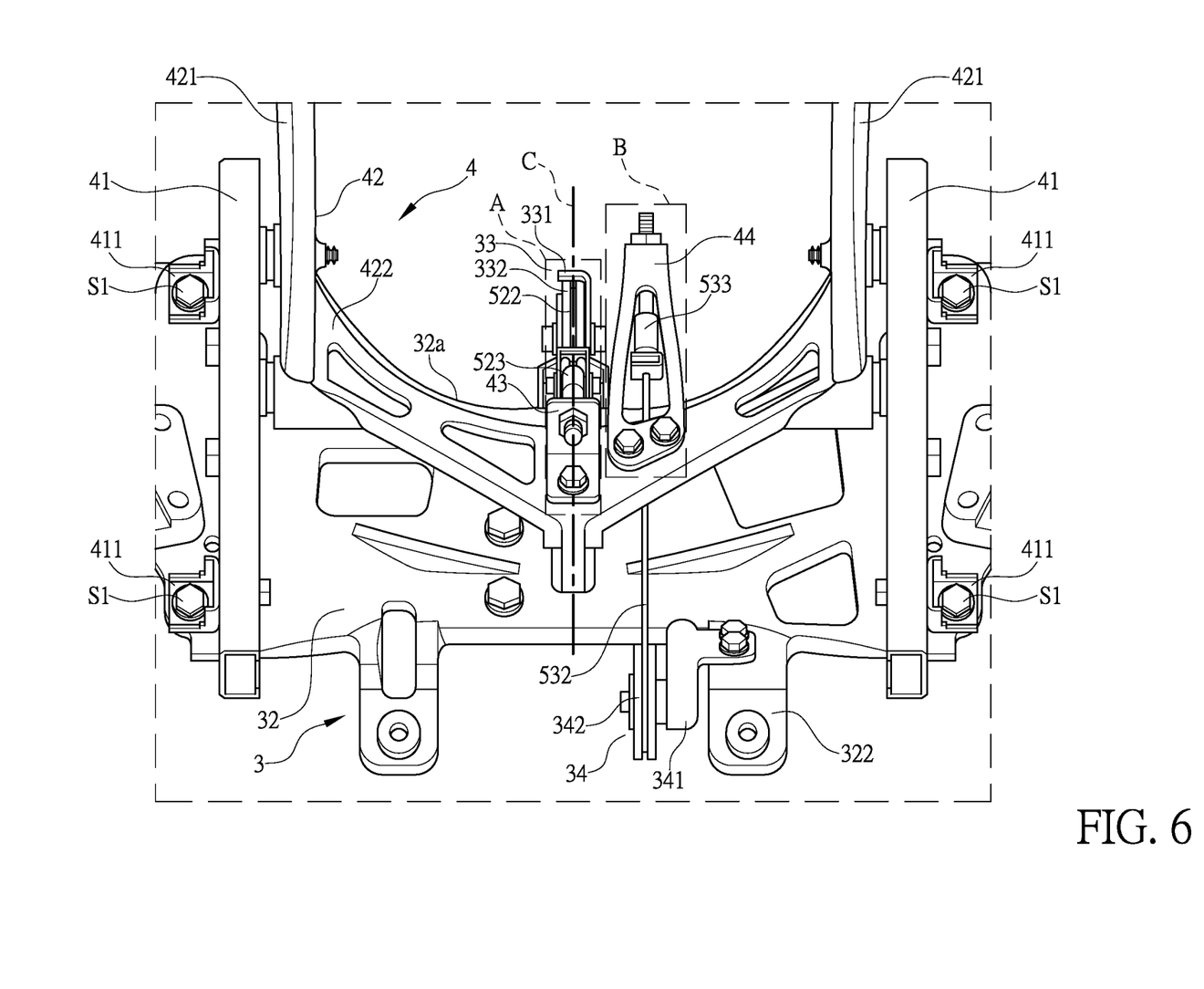
FIG. 6 is a front view showing the windshield support frame set according to the present invention.
Figure 7:
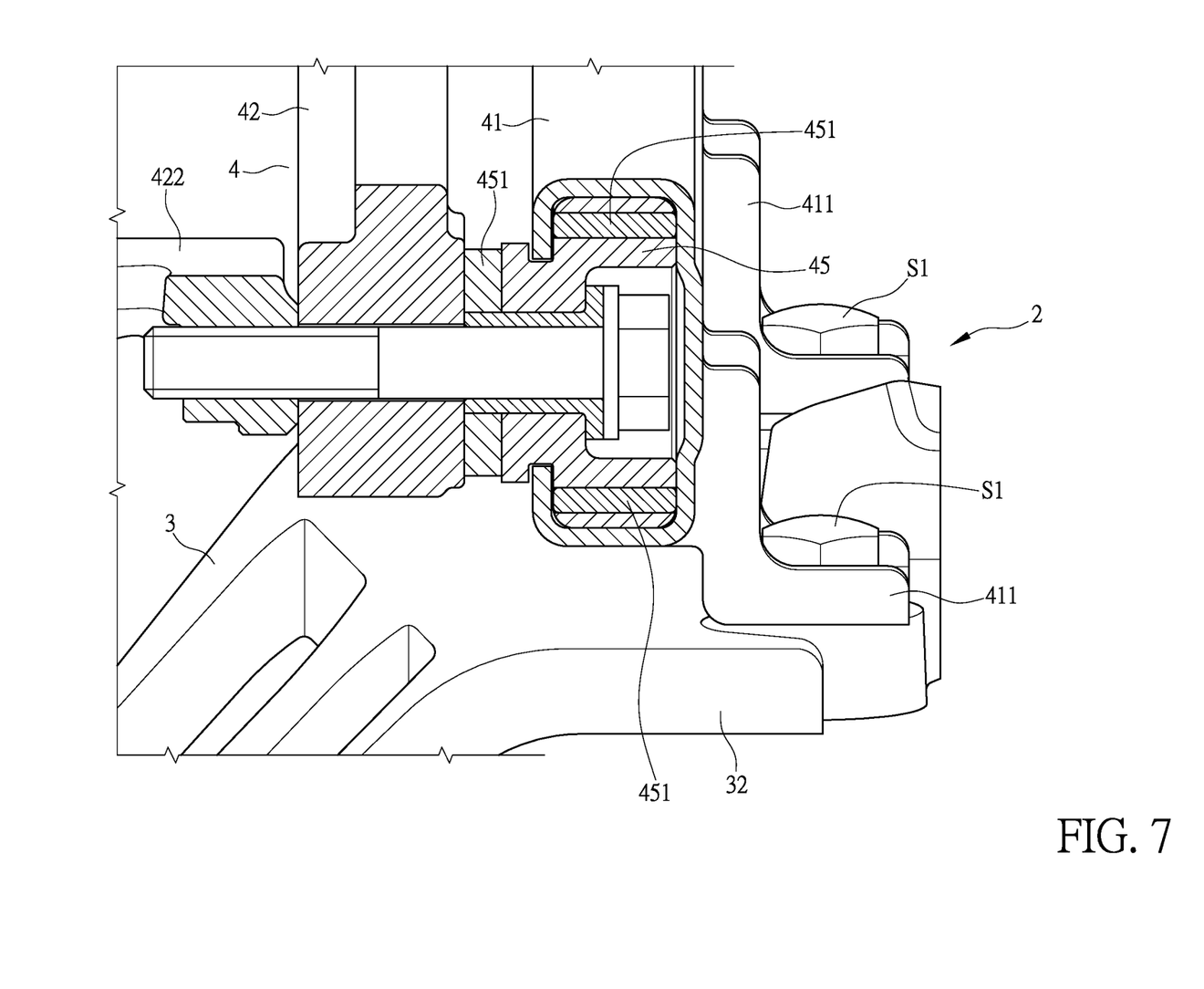
FIG. 7 is a cross-sectional view showing a slide rail and a guide block according to the present invention.

As shown in FIGS. 3, 4, and 5, the head tube 111 of the vehicle frame unit 11 is provided with a windshield support frame fastening portion 112 toward a vehicle body front side. The windshield support frame fastening portion 112 is arranged for receiving the vehicle body mounting frame seat unit 3 to fasten thereto. The windshield support frame fastening portion 112 is provided with a plurality of fastening holes 1121. The vehicle frame unit 11 is provided with a power unit fastening seat 113 at a lower side of the head tube 111. The power unit fastening seat 113 is arranged for receiving a power motor 51 of the power unit 5 to fasten thereto and position thereon, so as to enhance the positionability of the power unit 5 and effectively reduce an overall weight of the windshield support frame set 2.

As shown in FIGS. 3, 4, and 5, a vehicle body mounting frame 31 is arranged at one side of the vehicle body mounting frame seat unit 3. The vehicle body mounting frame 31 is formed with a plurality of mounting holes 311, and the mounting holes 311 correspond to the fastening holes 1121 of the windshield support frame fastening portion 112, so that threading fastener elements S may penetrate through the mounting holes 311 and the fastening holes 1121 to fasten the vehicle body mounting frame seat unit 3 to the vehicle frame unit 11 and to achieve an effect of securely positioning of the vehicle body mounting frame seat unit 3 on the vehicle frame unit 11. A slide rail mounting frame 32 is arranged on the other side of the vehicle body mounting frame seat unit 3 that is opposite to the vehicle body mounting frame 31. The slide rail mounting frame 32 is formed with a plurality of connecting holes 321. The slide rail mounting frame 32 is provided for connecting slide rails 41 of the sliding frame unit 4. The vehicle body mounting frame 31 and the slide rail mounting frame 32 can be structured as an integrally formed one piece, or can be formed as two separate parts connected together by means of fastening or welding. The two-part-fastened form is taken as an example for illustrating the present invention, but the structural form of the vehicle body mounting frame seat unit 3 of the present invention is not limited thereto. A middle portion of the slide rail mounting frame 32 is recessed to form a receiving portion 32a, and a first guide roller set 33 is arranged inside the receiving portion 32a, so that the receiving portion 32a provides an effect of protection to the first guide roller set 33. A locking rib 322 is extended from the slide rail mounting frame 32 in a down inclining manner toward a vehicle body front. A second guide roller set 34 is mounted to the locking rib 322, so that when viewed from the vehicle body front side of the motorcycle 1, the first guide roller set 33 and the second guide roller set 34 are respectively arranged on upper and lower sides of the slide rail mounting frame 32, and are arranged parallel in a vehicle left-right direction in a front view of the motorcycle 1, so as to effectively utilize a space of the slide rail mounting frame 32 and to prevent the first guide roller set 33 and the second guide roller set 34 from interfering with other parts on left and right sides at the front portion of the motorcycle 1 and to further prevent the front of the motorcycle 1 from becoming bulky due to the arrangement of the first guide roller set 33 and the second guide roller set 34. The first guide roller set 33 comprises a guide roller seat 331 and a guide roller 332 pivotally mounted to the guide roller seat 331 and freely rotatable. The second guide roller set 34 comprises a guide roller seat 341 and a guide roller 342 pivotally mounted to the guide roller seat 341 and freely rotatable.

As shown in FIGS. 3, 4, and 5, the sliding frame unit 4 comprises the slide rails 41, a sliding frame 42 guided by and sliding on the slide rail 41, and a first guide wire connection seat 43 and a second guide wire connection seat 44 arranged on a lower portion of the sliding frame 42. The slide rails 41 are formed of generally C-shaped and one-side-open rails arranged pairwise as a left one and a right one. The slide rails 41 are generally curved, and each individual one of the slide rails 41 is provided, on an outer edge thereof, with fixing lugs 411 arranged respectively at upper and lower locations. The fixing lugs 411 correspond to the connecting holes 321 of the slide rail mounting frame 32 of the vehicle body mounting frame seat unit 3, so that threading fastener elements 51 are allowed to penetrate through the fixing lugs 411 and the connecting holes 321 to thereby have the slide rails 41 fastened to and positioned on the slide rail mounting frame 32 of the vehicle body mounting frame seat unit 3. In a side elevational view of the motorcycle 1, a portion of the guide roller 342 of the second guide roller set 34 is located below the slide rails 41.

As shown in FIGS. 3, 4, 5, 6, and 7, rear upper portions of the sliding frame 42 of the sliding frame unit 4 are extended, in an inclining manner, to form windshield locking portions 421 that are arranged pairwise as a left one and a right one. The windshield locking portions 421 are provided with a plurality of locking holes 4211. The locking holes 4211 of the windshield locking portions 421 receive the windshield 6 to fastened thereto and positioned thereon. The sliding frame 42 is provided with a connection bridge portion 422 at a front end of the pairwise arranged left and right windshield locking portions 421. The first guide wire connection seat 43 and the second guide wire connection seat 44 are arranged on the connection bridge portion 422 by means of fastening or welding, and fastening is taken as an example for illustration of the present invention, but the way of connection among the first guide wire connection seat 43, the second guide wire connection seat 44, and the connection bridge portion 422 is not limited thereto. As a further illustration, the first guide wire connection seat 43 is arranged at a middle portion of the connection bridge portion 422, and the second guide wire connection seat 44 is arranged on the connection bridge portion 422 at a location beside the first guide wire connection seat 43.

As shown in FIGS. 3, 4, 5, 6, and 7, the sliding frame 42 is provided, on each of two outer sides of the connection bridge portion 422, with guide blocks 45 that are pairwise arranged as an upper one and a lower one. The guide blocks 45 comprise elastic pads 451 arranged in an interior and one side thereof. The elastic pads 451 provide the guide blocks 45 with effects of tightness and silence during sliding thereof, and also stabilizing the sliding. The guide blocks 45 are received in the slide rails 41, so that the sliding frame 42, when driven by the power unit 5 to slide, is slid in a smooth and stable manner toward a preset direction by means of the guide blocks 45 being constrained and guided by the slide rails 41.

As shown in FIGS. 2, 3, 4, 5, and 6, the power unit 5 comprises a power motor 51, and a first control cable 52 and a second control cable 53 that are connected to the power motor 51 and are drivable by the power motor 51. The power motor 51 is fastened to the power unit fastening seat 113 of the vehicle frame unit 11, and the power motor 51 is in electrical connection with a battery of a main power source (not shown in the drawings) of the motorcycle 1, so as to receive electricity for operation from the power motor 51. Further, the power motor 51 is also in electrical connection with a control switch (not shown in the drawings) arranged on a steering handlebar 12 of the motorcycle 1, so that whether the power motor 51 is put into operation is controlled by means of the control switch.

As shown in FIGS. 2, 3, 4, 5, and 6, the first control cable 52 comprises an outer tube 521 and an inner wire 522. One end of the outer tube 521 is connected to the power motor 51, and the inner wire 522 is penetrating through and arranged in the outer tube 521. An end of the inner wire 522 that penetrates through the outer tube 521 is connected in the power motor 51, and an opposite end of the inner wire 522 is provided with a connecting element 523. The side of the inner wire 522 that is provided with the connecting element 523 is wound around the guide roller 332 of the first guide roller set 33 and then connected, by means of the connecting element 523, to the first guide wire connection seat 43, so that the power motor 51 may operate the first control cable 52 to cause the sliding frame 42 of the sliding frame unit 4 to conduct an upward sliding motion, and more specifically, the power motor 51 uses the first control cable 52 and the guide roller 332 of the first guide roller set 33 as a power saving arrangement, and the power motor 51 can thus easily utilize the first control cable 52 to make the sliding frame 42 of the sliding frame unit 4 performing the upward sliding motion. The second control cable 53 comprises an outer tube 531 and an inner wire 532. One end of the outer tube 531 is connected to the power motor 51, and the inner wire 532 is penetrating through and arranged in the outer tube 531. An end of the inner wire 532 that penetrates through the outer tube 531 is connected in the power motor 51, and an opposite end of the inner wire 532 is provided with a connecting element 533. The side of the inner wire 522 that is provided with the connecting element 523 is wound around the guide roller 342 of the second guide roller set 34 and then connected, by means of the connecting element 533, to the second guide wire connection seat 44, so that the power motor 51 may operate the second control cable 53 to cause the sliding frame 42 of the sliding frame unit 4 to conduct a downward sliding motion, and more specifically, the power motor 51 uses the second control cable 53 and the guide roller 342 of the second guide roller set 34 as a power saving arrangement, and the power motor 51 can thus easily utilize the second control cable 53 to make the sliding frame 42 of the sliding frame unit 4 performing the downward sliding motion. Speaking in a more detailed way, the power motor 51 and the first control cable 52 define a raising stroke A of the windshield 6, and the power motor 51 and the second control cable 53 define a lowering stroke B of the windshield 6. In a front view of the motorcycle, the raising stroke A of the windshield 6 and the lowering stroke B of the windshield 6 are arranged, in a parallel manner, in a vehicle left-right direction, and are arranged inboard of the two slide rails 41, so as to prevent the front of the motorcycle 1 from becoming bulky. Speaking a more detailed way, since, in the front view of the motorcycle 1, the present invention provides that the raising stroke A and the lowering stroke B are arranged in a manner of both being close to a center line C of the motorcycle 1, and more specifically, the raising stroke A of the windshield 6 is set up on the center line C of the motorcycle 1, meaning the raising stroke A is arranged to coincide with the center line C of the motorcycle 1, and the lowering stroke B of the windshield 6 is arranged at a location adjacent to the raising stroke A in a manner of being parallel therewith, so as to guarantee operation stability of the sliding frame 42 and the windshield 6 in the raising stroke A and the lowering stroke B.

Figure 2:
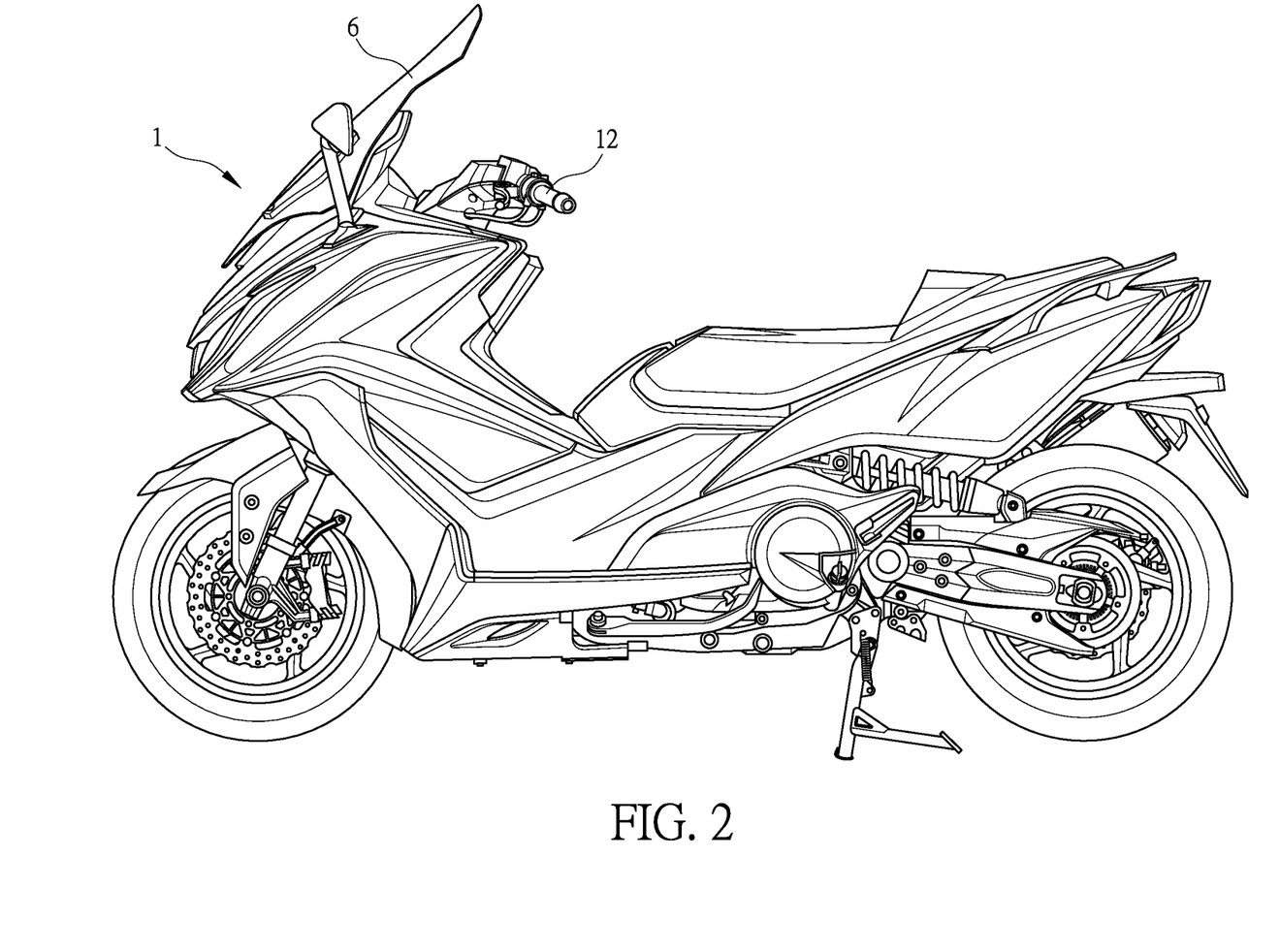
FIG. 2 is a schematic view showing arrangement of a motorcycle front windshield according to the present invention.
Figure 8:
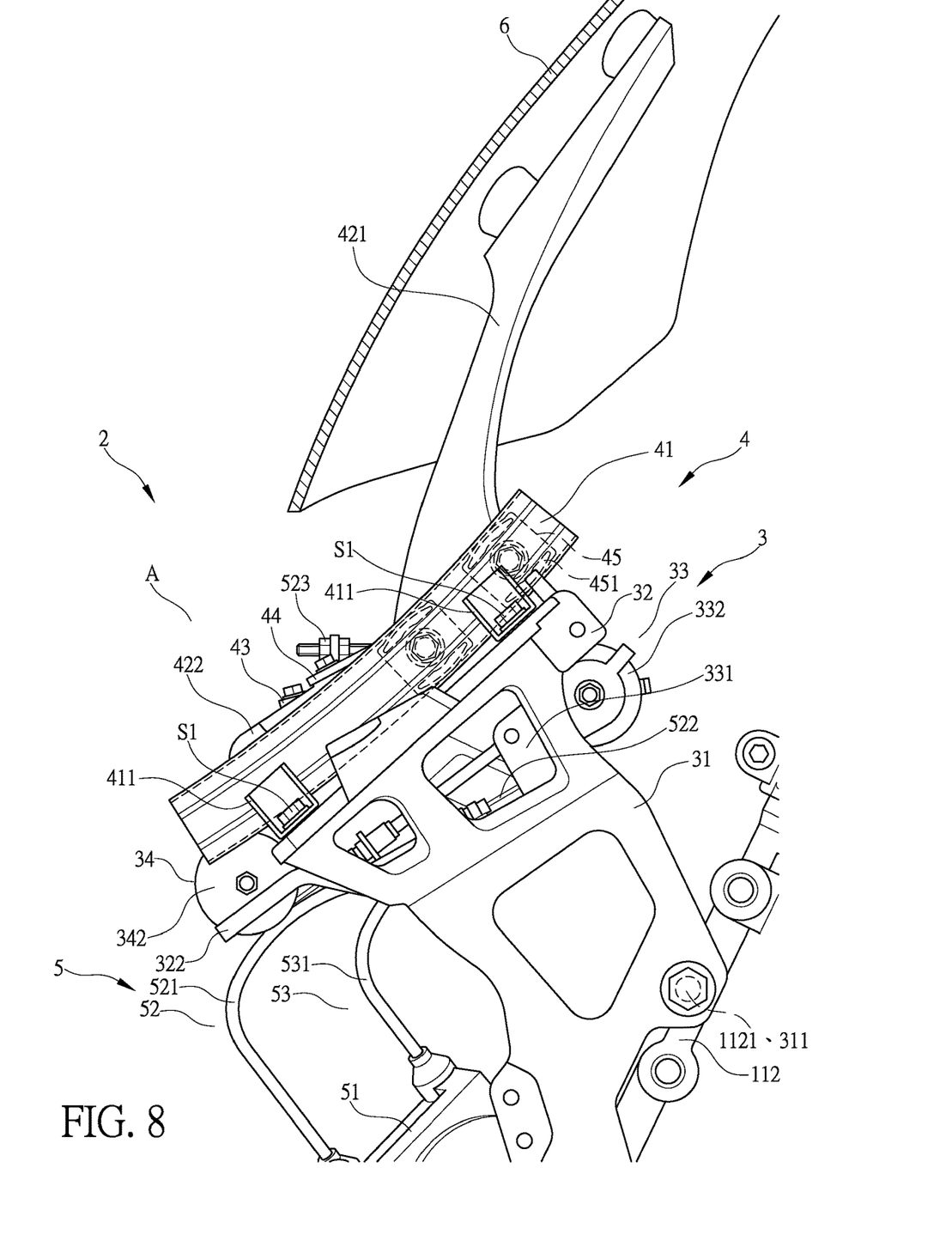
FIGS. 8 and 9 are views illustrating an operation of raising of the windshield and the windshield support frame set according to the present invention.
Figure 9:
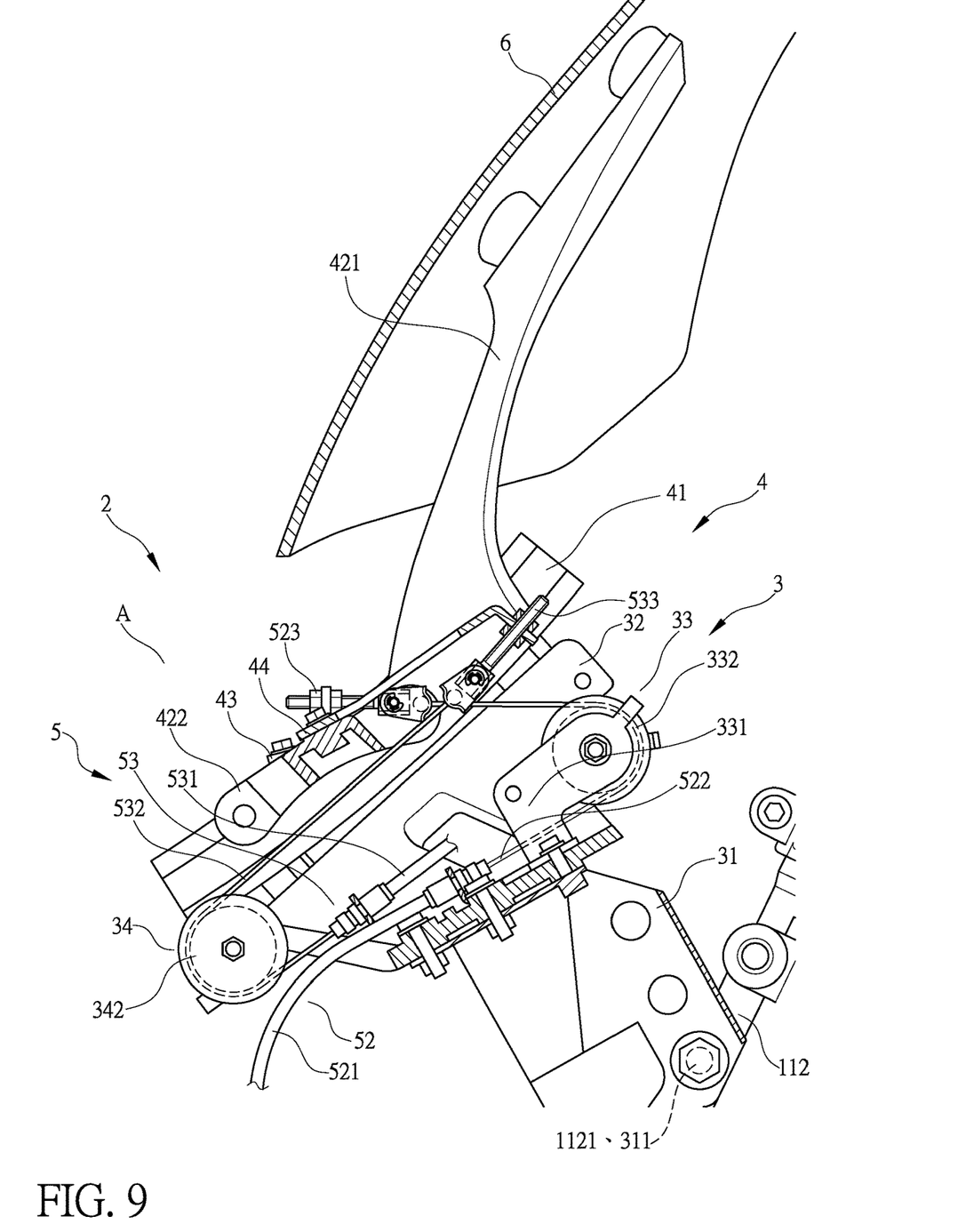

As shown in FIGS. 2, 8, and 9, to implement the present invention, when an operator attempts to adjust the height of the windshield 6 for adjusting the height of the windshield 6 from a low location to a high location, the operator presses down the control switch provided on the steering handlebar 12 to supply electrical power to the power motor 51 of the power unit 5 to cause operation thereof, so that the power motor 51 winds up the inner wire 522 of the first control cable 52 and also releases the inner wire 532 of the second control cable 53, and thus, the inner wire 522 of the first control cable 52 pulls the first guide wire connection seat 43 to move to thereby cause the sliding frame 42 of the sliding frame unit 4 to conduct an upward sliding motion, whereby the sliding frame 42 of the sliding frame unit 4, due to the guide blocks 45 being constrained by and guided by the slide rails 41, moves along the track defined by the slide rail 41 to raise upwards until the inner wire 522 of the first control cable 52 is wound up by the power motor 51 to a winding dead point, where the height of the windshield 6 is a preset highest height. During the raising stroke A of the windshield 6, the operator may press down the control switch provided on the steering handlebar 12 again to stop the operation of the power motor 51, so as to make the windshield 6 stop at any desired location.

Figure 10:
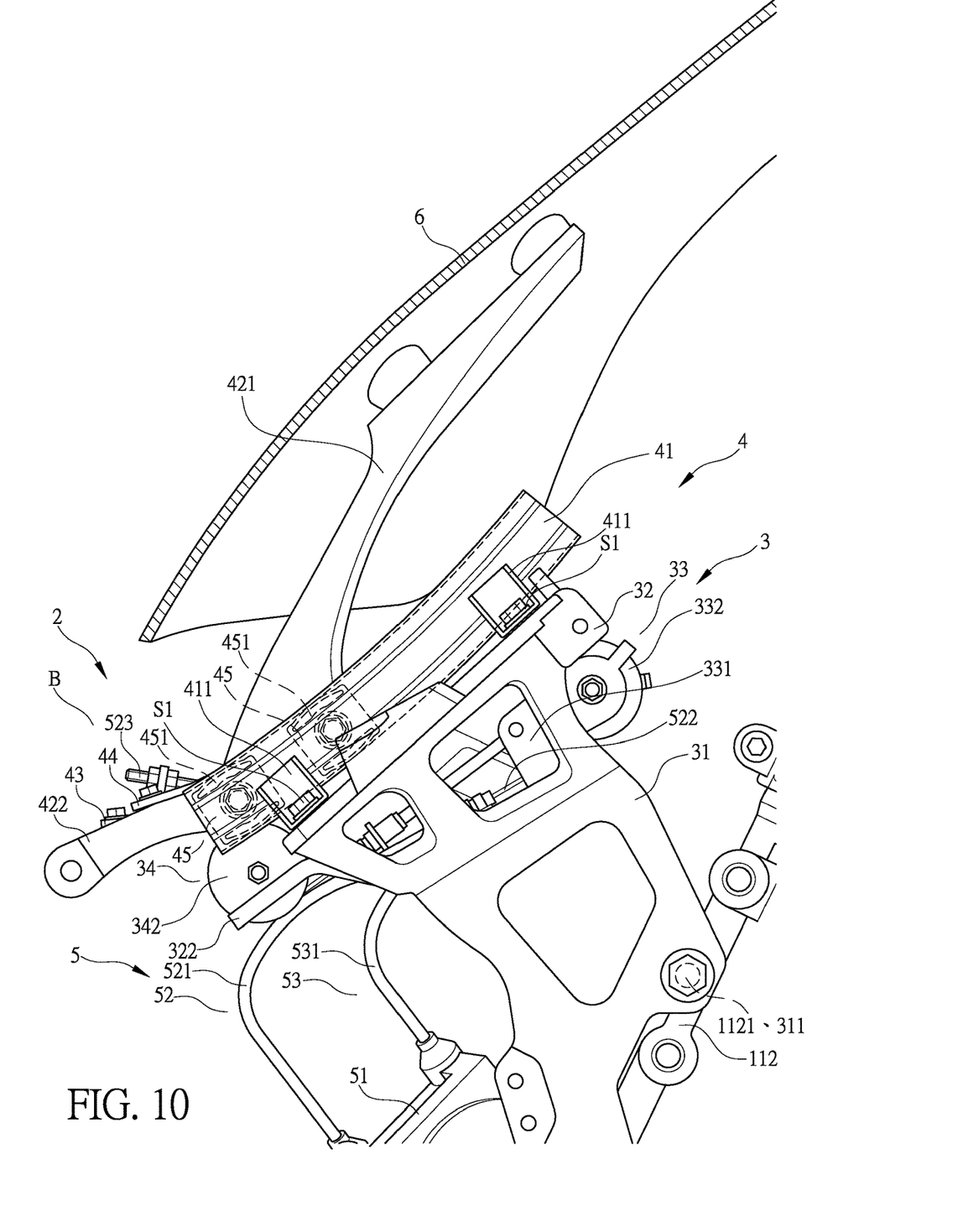
FIGS. 10 and 11 are views illustrating an operation of lowering of the windshield and the windshield support frame set according to the present invention.
Figure 11:
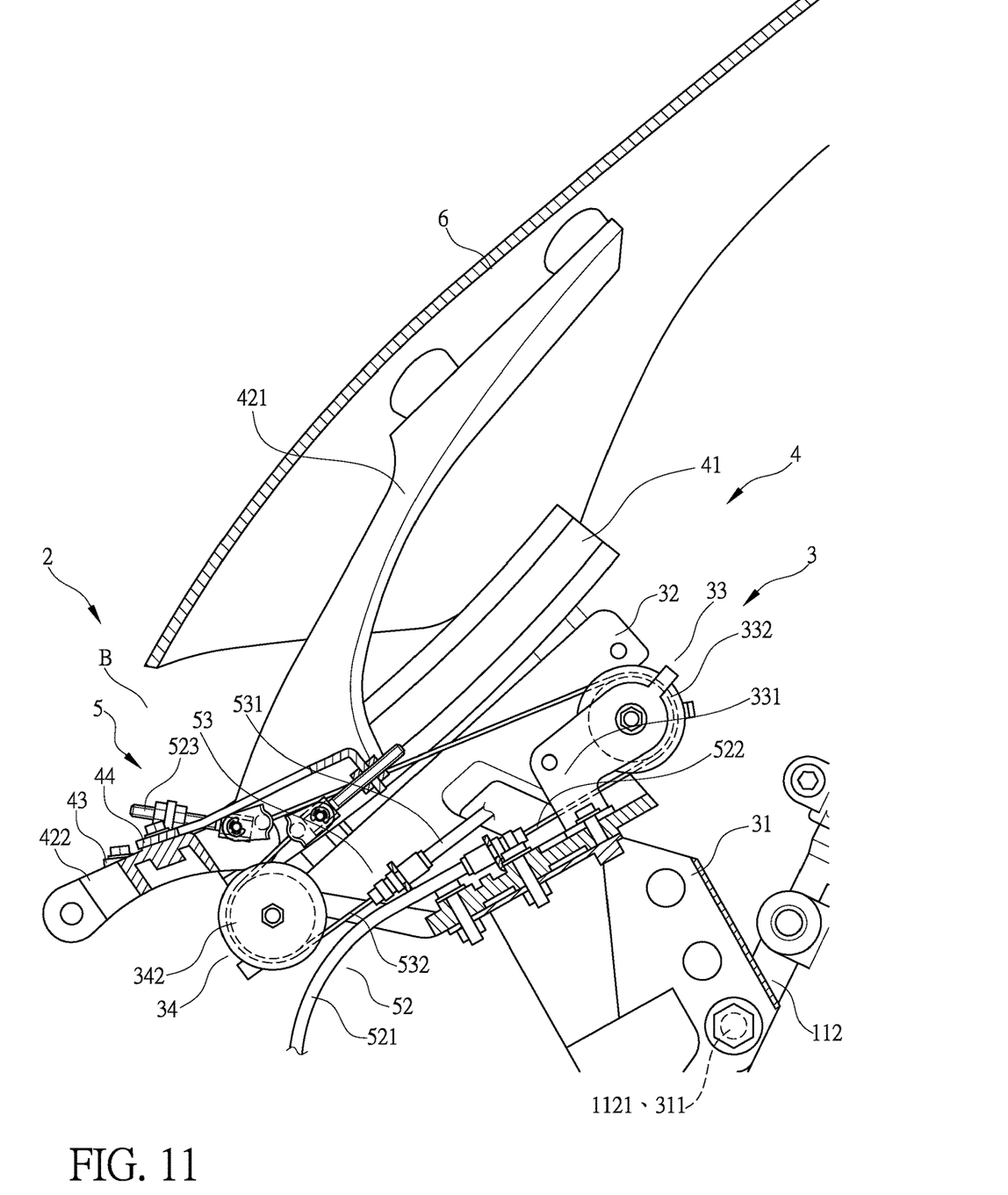

As shown in FIGS. 2, 10, and 11, when the operator attempts to adjust the height of the windshield 6 for adjusting the height of the windshield 6 to a low location, the operator re-presses down the control switch provided on the steering handlebar 12, and the power motor 51 is operated to wind up the inner wire 532 of the second control cable 53, while releasing the inner wire 522 of the first control cable 52, and the inner wire 532 of the second control cable 53 pulls the second guide wire connection seat 44 to move to thereby cause the sliding frame 42 of the sliding frame unit 4 to conduct a downward sliding motion, whereby the sliding frame 42 of the sliding frame unit 4, due to the guide blocks 45 being constrained by and guided by the slide rails 41, moves along the track defined by the slide rail 41 to lower downward, until the inner wire 532 of the second control cable 53 is wound up by the power motor 51 to a winding dead point, where the height of the windshield 6 is a present lowest point, and at this moment, the height of the windshield 6 is lowered down to return the original low position. During the lowering stroke B of the windshield 6, the operator may press down the control switch provided on the steering handlebar 12 again to stop the operation of the power motor 51, so as to make the windshield 6 stop at any desired location.

The primary efficacy of the present invention is that the windshield support frame set 2 comprises the vehicle body mounting frame seat unit 3, the sliding frame unit 4 that is mounted on the vehicle body mounting frame seat unit 3, and the power unit 5 that drives the sliding frame unit 4 to slide, and the windshield 6 is mounted on the sliding frame unit 4; the vehicle body mounting frame seat unit 3 comprises the vehicle body mounting frame 31 and the slide rail mounting frame 32, and the slide rail mounting frame 32 is provided with the first guide roller set 33 and the second guide roller set 34; the sliding frame unit 4 comprises the slide rails 41 connected to the slide rail mounting frame 32 and the sliding frame 42 that is guided by and sliding along the slide rails 41, and the sliding frame 42 is provided with the first guide wire connection seat 43 and the second guide wire connection seat 44; the power unit 5 comprises the power motor 51, and the first control cable 52 and the second control cable 53 that are coupled to the power motor 51 and are drivable by the power motor 51 to operate, the first control cable 52 being wound around the first guide roller set 33 to connect to the first guide wire connection seat 43, the second control cable 53 being wound around the second guide roller set 34 to connect to the second guide wire connection seat 44; the power motor 51 and the first control cable 52 define the raising stroke A of the windshield 6, and the power motor 51 and the second control cable 53 define the lowering stroke B of the windshield 6, and in a front view of the motorcycle 1, the raising stroke A of the windshield 6 and lowering stroke B of the windshield 6 are arranged, in a parallel manner, in the vehicle left-right direction; and as such, adjustment of height for the windshield 6 is made easy and bulkiness of the front of the motorcycle 1 is prevented.

We claim:

1. A front windshield structure of a motorcycle, comprising a windshield support frame set and a windshield arranged on the windshield support frame set, the windshield support frame set comprising a vehicle body mounting frame seat unit, a sliding frame unit on the vehicle body mounting frame seat unit, and a power unit operable to cause the sliding frame unit to slide, the windshield being arranged on the sliding frame unit; the vehicle body mounting frame seat unit comprising a vehicle body mounting frame and a slide rail mounting frame, the slide rail mounting frame being provided with a first guide roller set and a second guide roller set; the sliding frame unit comprising slide rails connected to the slide rail mounting frame and a sliding frame that is guided by and sliding along the slide rails, the sliding frame being provided with a first guide wire connection seat and a second guide wire connection seat; the power unit comprising a power motor, and a first control cable and a second control cable that are coupled to the power motor and are drivable by the power motor, the first control cable being wound around the first guide roller set to connect to the first guide wire connection seat, the second control cable being wound around the second guide roller set to connect to the second guide wire connection seat; characterized in that the power motor and the first control cable define a raising stroke of the windshield, and the power motor and the second control cable define a lowering stroke of the windshield, and in a front view of the motorcycle, the raising stroke of the windshield and the lowering stroke of the windshield are arranged, in a parallel manner, in a vehicle left-right direction.

2. The front windshield structure of the motorcycle according to claim 1, wherein the first guide roller set comprises a guide roller seat and a guide roller pivotally mounted on the guide roller seat and is freely rotatable; and in a side view of the motorcycle, at least a portion of the guide roller is located below the slide rails.

3. The front windshield structure of the motorcycle according to claim 1, wherein the first control cable comprise an outer tube and an inner wire; one end of the outer tube is connected to the power motor, and the inner wire is penetrating through and arranged in the outer tube, an end of the inner wire penetrating through the outer tube to connect in the power motor, an opposite end of the inner wire being provided with a connecting element, the side of the inner wire that is provided with the connecting element being wound around the guide roller of the first guide roller set to connect, by means of the connecting element, to the first guide wire connection seat; the second control cable comprises an outer tube and an inner wire; one end of the outer tube is connected to the power motor, and the inner wire is penetrating through and arranged in the outer tube, an end of the inner wire penetrating through the outer tube to connect in the power motor, an opposite end of the inner wire being provided with a connecting element, the side of the inner wire that is provided with the connecting element being wound around the guide roller of the second guide roller set to connect, by means of the connecting element, to the second guide wire connection seat.

4. The front windshield structure of the motorcycle according to claim 1, wherein the slide rails are formed of generally C-shaped and one-side-open rails arranged pairwise as a left one and a right one, and the slide rails are generally curved.

5. The front windshield structure of the motorcycle according to claim 1, wherein the sliding frame is provided, on each of two outer sides, with at least one guide block.

6. The front windshield structure of the motorcycle according to claim 5, wherein the guide block comprises an elastic pad.

7. The front windshield structure of the motorcycle according to claim 1, wherein the motorcycle comprises a vehicle frame unit, the vehicle frame unit being provided with a power unit fastening seat at a location below the head tube, the power unit fastening seat receiving the power motor of the power unit to fasten thereto and position thereon.

8. The front windshield structure of the motorcycle according to claim 1, wherein the slide rail mounting frame is provided with a receiving portion that is formed through recessing, and the first guide roller set is arranged in the receiving portion.

9. The front windshield structure of the motorcycle according to claim 1, wherein when viewed from a vehicle body front side of the motorcycle, the first guide roller set and the second guide roller set are respectively arranged upper and lower sides of the slide rail mounting frame, and are arranged parallel in a vehicle left-right direction in a front view of the motorcycle.

\* \* \* \* \*